(12) United States Patent
Al-Mufti et al.

(10) Patent No.: US 11,962,236 B2
(45) Date of Patent: Apr. 16, 2024

(54) APPARATUSES AND METHODS FOR AVERTING HUMAN HARM DUE TO HIGH VOLTAGE POWERLINES

(71) Applicant: CommScope Technologies LLC, Claremont, NC (US)

(72) Inventors: Khalid W. Al-Mufti, Sterling, VA (US); Thomas F. Craft, Jr., Murphy, TX (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/155,497

(22) Filed: Jan. 17, 2023

(65) Prior Publication Data

US 2023/0155484 A1     May 18, 2023

Related U.S. Application Data

(63) Continuation of application No. 17/468,011, filed on Sep. 7, 2021, now Pat. No. 11,581,800.

(60) Provisional application No. 63/075,451, filed on Sep. 8, 2020.

(51) Int. Cl.
| | |
|---|---|
| *H02M 1/36* | (2007.01) |
| *G05B 9/02* | (2006.01) |
| *H02J 1/00* | (2006.01) |
| *H02M 3/04* | (2006.01) |

(52) U.S. Cl.
CPC ............... *H02M 1/36* (2013.01); *G05B 9/02* (2013.01); *H02J 1/00* (2013.01); *H02M 3/04* (2013.01)

(58) Field of Classification Search
CPC ... H02M 1/36; H02M 3/04; G05B 9/02; H02J 1/00

USPC ......................................................... 307/326
See application file for complete search history.

(56) References Cited

U.S. PATENT DOCUMENTS

| | | | |
|---|---|---|---|
| 8,115,457 | B2 | 2/2012 | Balakrishnan et al. |
| 8,571,738 | B1 | 10/2013 | Potter et al. |
| 2002/0130640 | A1* | 9/2002 | Acatrinei .................. G05F 1/70 323/222 |
| 2004/0257271 | A1 | 12/2004 | Jacobson et al. |
| 2011/0128034 | A1 | 6/2011 | Hawkins et al. |
| 2015/0256059 | A1* | 9/2015 | Balakrishnan .......... H02M 1/32 320/166 |
| 2021/0328443 | A1* | 10/2021 | Wolgemuth ........ H02J 7/00304 |

(Continued)

FOREIGN PATENT DOCUMENTS

WO     2016129738 A1     8/2016

OTHER PUBLICATIONS

IEC, "Electrical Installations and Protection Against Electric Shock", IEC TC 64, Jun. 15, 2018, Committee Draft for Vote (CDV), 64/2275/CDV, Project No. IEC 60479-1, pp. 1 through 73, International Electrotechnical Commission, IEC.

(Continued)

*Primary Examiner* — Hal Kaplan
*Assistant Examiner* — Swarna N Chowdhuri
(74) *Attorney, Agent, or Firm* — Fogg & Powers LLC

(57) ABSTRACT

Techniques are disclosed that use an alternating current bridge circuit to determine whether an impedance change occurs at an input to DC-DC voltage converter(s). Techniques are also disclosed for a DC power distribution system that utilizes isolation circuitry coupled to an input of DC-DC voltage converter(s).

20 Claims, 7 Drawing Sheets

(56) References Cited

U.S. PATENT DOCUMENTS

2021/0373058 A1\* 12/2021 Yang ................ G01R 27/2605
2022/0077768 A1   3/2022 Al-Mufti

OTHER PUBLICATIONS

International Searching Authority, "International Search Report and Written Opinion from PCT Application No. PCT/US2021/049257 dated Dec. 23, 2021", from Foreign Counterpart to U.S. Appl. No. 17/468,011, pp. 1 through 10, Published in: KR.
U.S. Patent and Trademark Office, "Notice of Allowance", U.S. Appl. No. 17/468,011, filed Jul. 18, 2022, pp. 1 through 19, Published: US.
U.S. Patent and Trademark Office, "Notice of Allowance", U.S. Appl. No. 17/468,011, dated Oct. 3, 2022, pp. 1 through 21, Published: US.

\* cited by examiner

APPARATUSES AND METHODS FOR AVERTING HUMAN HARM DUE TO HIGH VOLTAGE POWERLINES

CROSS-REFERENCE TO RELATED APPLICATIONS

The present application is a continuation application of U.S. patent application Ser. No. 17/468,011, filed Sep. 7, 2021; which claims benefit of U.S. patent application Ser. No. 63/075,451, filed Sep. 8, 2020; the entire contents of the aforementioned patent applications are incorporated herein by reference as if set forth in their entirety.

BACKGROUND 5G cellular radios can operate using millimeter-wave carrier frequencies. The effective range is short for remote radio units (RRUs) of distributed antenna systems, and 5G base stations (gNodeB or gNB), using millimeter-wave carrier frequencies. Thus, many RRUs and/or gNBs must be co-located to provide continuous coverage, particularly in regions where there is a high density of user equipment that utilize the RRUs and/or gNBs.

The RRUs and/or gNBs require direct current (DC) electrical power to power their radios of the RRUs and/or gNBs. Conventionally, such power is distributed using alternating current (AC) electrical power. However, the alternating current (AC) electrical power must be converted to DC electrical power to facilitate operation of the radios. Conversion of AC electrical power to DC electrical power results in electrical power loss, and thus is inefficient.

Alternatively, DC electrical power can be supplied, in lieu of AC electrical power, to the radios. To enhance efficiency, DC power can be distributed at a high DC voltage level, e.g., 380V, to reduce resistive power losses in a power distribution system electrically coupling the DC electrical power to the radios. For example, 380V DC results in lower dissipative power loss in cabling than 110V AC or even 220V AC.

However, if a human being makes electrical contact with a power distribution system using a high DC supply voltage, the human being can suffer strong muscle contractions or suffer ventricular fibrillation. For example, muscle contractions can cause a human being to fall off a ladder or a roof. As a result, the human being may be injured or killed.

SUMMARY

An apparatus comprising: a first electrical impedance comprising a first node and a second node; a second electrical impedance comprising a first node and a second node; a third electrical impedance comprising a first node and a second node; a first inductor comprising a first node and a second node; a first bridge node electrically connecting the first node of the first electrical impedance to a first node of the second electrical impedance; a second bridge node configured to electrically connect the second node of the second electrical impedance through the first inductor to a first input node of at least one direct current (DC)-DC voltage converter configured to convert a higher input DC voltage to a lower output DC voltage and comprising an input impedance including a second inductor is electrically coupled between the second bridge node and a third bridge node; the third bridge node electrically connected to the first node of the third electrical impedance and a second input node of the at least one DC-DC voltage converter; a fourth bridge node electrically connecting the second node of the third electrical impedance and the second node of the first electrical impedance; an alternating current (AC) signal generator configured to generate an AC signal comprising a fundamental frequency and comprising a first node and a second node, wherein the first node of the AC signal generator is electrically coupled to the first bridge node and the second node of the AC signal generator is electrically coupled to the third bridge node, wherein at the fundamental frequency greater than a threshold frequency, an impedance value of the first inductor in parallel with the second inductor substantially equals a value of the first electrical impedance divided by a value of the second electrical impedance multiplied by a value of the third electrical impedance; and detector circuitry comprising a first input node, a second input node, and an output, wherein the first input node of the detector circuitry is electrically coupled to the second bridge node and the second input node of the detector circuitry is electrically coupled to the fourth bridge node, wherein the detector circuitry is configured to (a) detect when a differential peak or root mean square (RMS) voltage or current level across the second bridge node and the fourth bridge node exceeds a corresponding threshold level and (b) upon such detection, then generate an electrical signal to cause a DC voltage across the second bridge node and the third bridge node to be reduced.

A direct current (DC) power distribution system comprising: a DC power supply comprising an output configured to supply DC electrical power; first isolation circuitry comprising an input and an output, wherein the input is electrically coupled to the output of the DC power supply; a first inductor; a first at least one DC-DC voltage converter comprising an input and an output, wherein the input of the first at least one DC-DC voltage converter electrically coupled through the first inductor to the output of the first isolation circuitry, and wherein each DC-DC voltage converter converts a higher input DC voltage to a lower output DC voltage; wherein the first isolation circuitry is configured to detect when a first additional resistance with a first resistance value less than or equal to a resistance threshold level is connected across the input of the first at least one DC-DC voltage converter, and to reduce a DC voltage supplied to the input of the first at least one DC-DC voltage converter; second isolation circuitry comprising an input and an output, wherein the input is electrically coupled to and configured to receive DC electrical power from either the output of the DC power supply or the output of the first isolation circuitry; a second inductor; and a second at least one DC-DC voltage converter comprising an input and an output, wherein the input of the second at least one DC-DC voltage converter is electrically coupled through the second inductor to the output of the second isolation circuitry; wherein the second isolation circuitry is configured to detect when a second additional resistance with a second resistance value less than or equal to the resistance threshold level is connected across the input of the second at least one DC-DC voltage converter, and to reduce a DC voltage supplied to the input of the second at least one DC-DC voltage converter; wherein the reduction of the DC voltage supplied to the input of the second at least one DC-DC voltage converter does not affect the DC voltage supplied to the input of the first at least one DC-DC voltage converter.

A method, comprising: supplying DC power at a first voltage level through a first inductor to at least a second bridge node and a third bridge node of an electrical bridge circuit, wherein the electrical bridge circuit comprises a first impedance comprising a first node and a second node, a second impedance comprising a first node and a second node, a third impedance comprising a first node and a second node, an input impedance of at least one DC-DC voltage converter comprising a first node and a second node, a first bridge node, the second bridge node, the third bridge node, and a fourth bridge node, wherein the first bridge node connects the first node of the first impedance to the first node of the second impedance, the second bridge node connects the second node of the second impedance to the first node of the input impedance of the at least one DC-DC voltage converter, the third bridge node connects the first node of third impedance to the second node of the input impedance, and the fourth bridge node connects the second node of the first impedance to the second node of the third impedance, and wherein the input impedance comprises a second inductor electrically coupled between the second bridge node and the third bridge node; supplying an alternating current (AC) signal, comprising a fundamental frequency, to the first bridge node and the third bridge node, wherein at the fundamental frequency greater than a threshold frequency, and wherein at the fundamental frequency greater than a threshold frequency, an impedance of the first inductor in parallel with the second inductor substantially equals the first impedance divided by the second impedance multiplied by the third impedance; determining if a differential peak or root mean square (RMS) voltage or current across the second bridge node and the fourth bridge node exceeds a corresponding threshold level is detected; and upon determining that the differential peak or the RMS voltage or the current across the first bridge node and the second bridge node exceeds the corresponding threshold level, then reducing a DC voltage level provided to an input of the at least one DC-DC voltage converter.

BRIEF DESCRIPTION OF THE DRAWINGS

Comprehension of embodiments of the invention is facilitated by reading the following detailed description in conjunction with the annexed drawings, in which.

DETAILED DESCRIPTION

Figure 1:
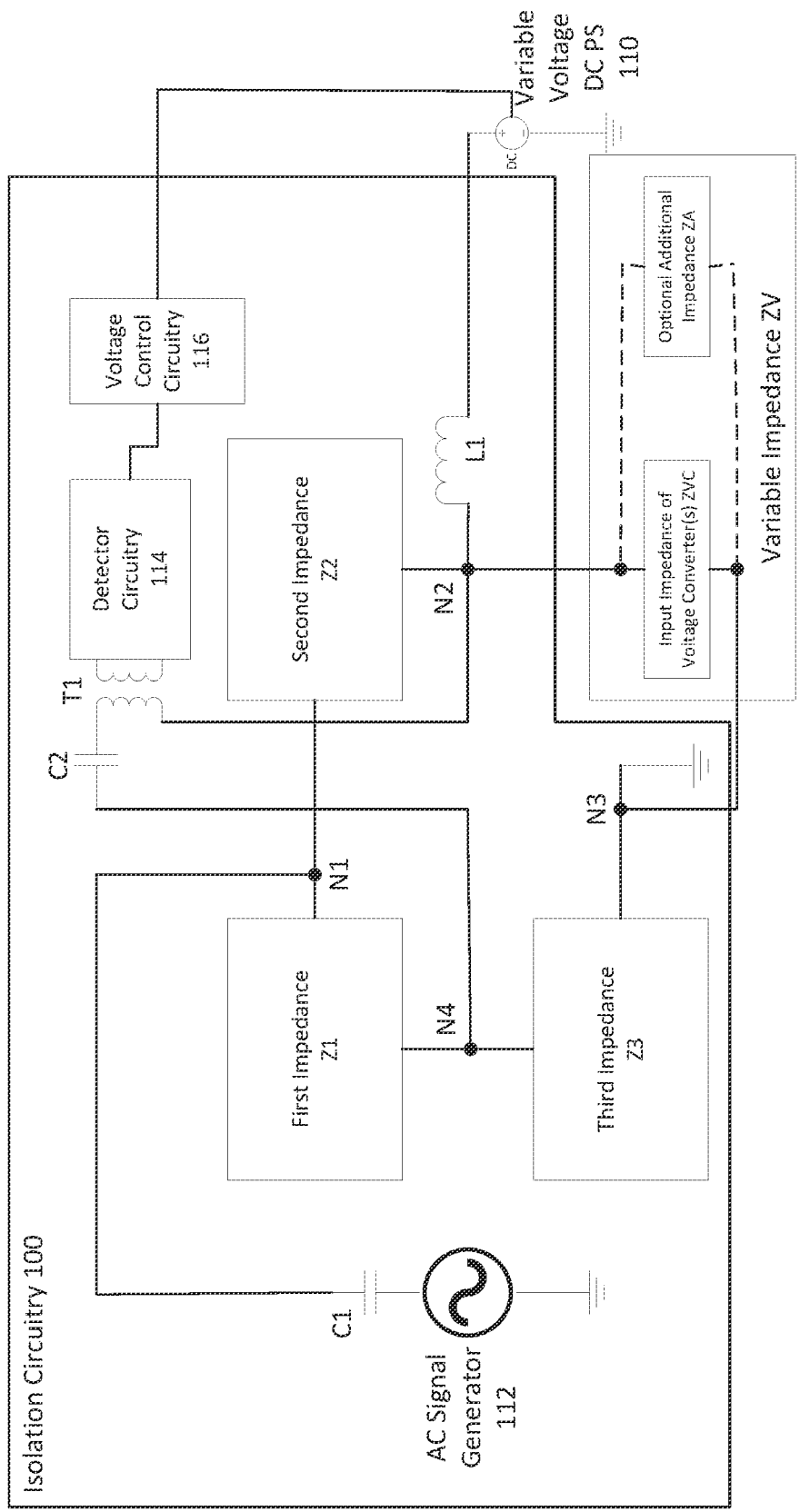
FIG. 1 illustrates a schematic diagram of one embodiment of isolation circuitry.

Embodiments of the invention are described that disclose how to prevent injury or death to a living entity that forms an electrical circuit with two conductors across which exists a high DC voltage. High DC voltage means a DC voltage that is capable of disabling or killing a living entity; optionally, the high DC voltage is a DC voltage that is greater than or equal to 190V. A living entity means a human being or an animal. However, the invention also protects the power distribution system and components electrically coupled to the power distribution system in the event of an inanimate object, e.g., water or other conductor, forming an electrical circuit with the two conductors. For pedagogical purposes, the invention will be illustrated as preventing injury to a living entity such as a human being. Further, although embodiments of the invention are illustrated with respect distributing DC electrical power having a high DC voltage to avoid injury to living entities, the embodiments are also applicable to any voltage range where a short circuit across two conductors may disrupt DC power distribution system and/or harm electrically coupled components powered by the DC electrical power. Optionally, the components powered by the DC electrical power may be radios, e.g., 5G radios.

When DC power is distributed with a DC voltage higher than an operating DC voltage of the components powered by the DC electrical power, the high DC voltage must be converted to the lower DC operating voltage of the components. For example, cellular radios and remote radio units have operating DC voltages of about −48V. The higher DC voltage of the distributed power may be converted to a lower DC voltage, e.g., the operating DC voltage of a component, by at least one DC-DC voltage converter. The at least one DC-DC voltage converter comprises one or more DC-DC voltage converters, where an input of each DC-DC voltage converter is electrically connected when there are two or more DC-DC voltage converters. Each DC-DC voltage converter (or DC-DC voltage converter circuitry, voltage converter, or voltage converter circuitry) means a buck converter circuit, a low drop out regulator circuit, or any other circuit that converts a higher input voltage to a lower output voltage. Thus, each DC-DC voltage converter is configured to receive a higher DC voltage at an input of the DC-DC voltage converter, and to provide a lower DC voltage at an output of the DC-DC voltage converter.

In certain embodiments of the invention, a change, i.e., a reduction, of impedance presented to at an input of at least one DC-DC voltage converter is detected. For purpose of clarity, a change in impedance may occur near or far away from the input of the at least one DC-DC voltage converter, and still reduces the impedance at the input. For example, a human being may contact two conductors of a cable (connected to the input) near or far from the input.

Upon detecting the reduction of impedance, the DC voltage power supply is disconnected from the power distribution network coupling the DC voltage power supply to the input of the at least one DC-DC voltage converter. If the DC voltage of the DC voltage power supply is sufficiently high, then injury and/or death resulting from the high DC voltage are prevented. Impedances described herein are electrical impedances. Thus, resistances, capacitances, and inductances described herein are electrical resistances, capacitances, and inductances.

In certain embodiments, isolation circuitry, comprising a portion of an alternating current (AC) Wheatstone bridge circuit, is used to sense when an impedance forming one leg or portion of the AC Wheatstone bridge circuit is diminished. Bridge circuitry may be referred to herein as a bridge. The AC Wheatstone bridge comprises four impedances (or impedance legs or portions). The impedance portion of the bridge that is not part of the isolation circuitry includes an input impedance of at least one DC-DC voltage converter, and optionally an optional impedance electrically coupled in parallel with the input impedance of the at least one DC-DC voltage converter. When the optional additional impedance is electrically connected in parallel to the impedance of the input of the at least one DC-DC voltage converter, then impedance of the variable impedance portion is reduced. The input impedance of the at least one DC-DC voltage converter and the optional additional impedance electrically coupled or connected in parallel may be referred to herein as the variable impedance. The variable impedance is separate from, and thus not part of, the isolation circuitry. The variable impedance may optionally comprise one or more other electrical components such as transmission line; such optional components exclude the optional additional impedance. The nominal value of the variable impedance means the input impedance of the at least one DC-DC voltage converter (and any optional components), but excludes the optional additional impedance.

Initially, four impedances are matched in a manner subsequently illustrated. A change in impedance in the variable impedance causes an imbalance in impedances that form the AC Wheatstone bridge so that an AC signal is output by the AC Wheatstone bridge. The isolation circuitry further comprises detector circuitry. Upon detecting a differential voltage or current of AC signal across two bridge nodes that is greater than a corresponding threshold level and with the detector circuitry, the isolation circuitry is configured to cause a DC voltage provided to the input of the at least one DC-DC voltage converter to be diminished. Thus, the DC power provided to the input of the DC-DC voltage converter may be reduced to zero, i.e., reducing the DC voltage level at the input of the DC-DC voltage converter to zero volts, or the DC power may continue to be provided to the DC-DC voltage converter, but with a reduced DC voltage level.

FIG. 1 illustrates a schematic diagram of one embodiment of isolation circuitry 100. The isolation circuitry 100 is configured to be electrically coupled between a variable voltage DC power supply (variable voltage DC PS) 110 and the variable impedance ZV. The variable impedance comprises the input impedance of at least one DC-DC voltage converter (or input of at least one DC-DC voltage converter), and optionally the optional additional impedance ZA. The optional additional impedance may optionally be a living entity or a low impedance substance. Optionally, the low impedance substance may be a conductor such as a conductive liquid such as water. FIG. 1 illustrates a variable voltage DC power supply 110 that generates a positive output voltage. This, however, is solely for pedagogical reasons. Embodiments of the invention may also utilize a variable voltage DC power supply 110 that generates a negative output voltage. The AC Wheatstone bridge comprises the variable voltage DC power supply 110.

The illustrated embodiment of the isolation circuitry 100 includes an AC signal generator 112, detector circuitry 114, a first inductor L1, a first impedance Z1, a second impedance Z2, and a third impedance Z3. Optionally, the isolation circuitry 100 includes a first capacitance C1, a second capacitance C2, a transformer T1, and voltage control circuitry 116.

The isolation circuitry 100 comprises three impedances (the first impedance Z1, the second impedance Z2, and the third impedance Z3) of the AC Wheatstone bridge. As is further explained herein, the fourth impedance of the AC Wheatstone bridge is the variable impedance ZV electrically connected (at a sufficiently high fundamental frequency of the AC signal) or coupled in parallel with an inductance of the first inductor L1.

The operation of the isolation circuitry 100 and AC Wheatstone bridge will now be described. The first impedance Z1, the second impedance Z2, and the third impedance Z3 are selected so that the nominal value of the variable impedance ZV in parallel with the inductance of the first inductor is substantially equal to $(Z2/Z1)*Z3$. As a result, the voltage and current amplitudes of the AC signal are equal at each of the second and fourth bridge nodes N2, N4. The detector circuitry 114 comprises a differential input. The differential amplitude of the voltage and current of the AC signal at the differential input is at or below a noise floor of the detector circuitry 114; thus, the differential amplitude of the voltage and current of the AC signal is not detectable by the detector circuitry 114 when the impedances are matched as described above. Upon the addition of the optional additional impedance ZA (having an impedance equal to or greater than a first impedance threshold value) being connected in parallel with the input impedance, the impedance of the variable impedance ZV no longer substantially matches the third impedance Z3. Optionally, the optional additional impedance ZA may be a resistance. As a result, the differential AC signal voltage and current levels at the second and fourth bridge nodes N2, N4, and thus the differential input of the detector circuitry 114, increases so that it can be detected by the detector circuitry 114. In response, the isolation circuitry 100 (e.g., the detector circuitry 114 and optionally the voltage control circuitry 116) is configured to reduce the DC voltage provided by the variable voltage DC power supply 110 to the variable impedance ZV (e.g., to the input of the at least one DC-DC voltage converter) when the impedance of the variable impedance falls below a second impedance threshold level. At the corresponding fundamental frequency of the AC signal, the inductance values of first inductor L1, the second inductor L2, and the optional transformer T1, and the capacitances of the optional first capacitor C1 and the optional second capacitor C2 are chosen so that the AC signal is detectable by the detector circuitry 114 across the second bridge node N2 and the fourth bridge node N4 when the impedance of the variable impedance falls below a threshold impedance level. Optionally, the optional first capacitor C1 and the optional second capacitor C2 each have a value of 100 nanoFarads.

The second impedance threshold level may be represented by a voltage or current threshold level of an AC signal corresponding to the second impedance threshold level. Optionally, the isolation circuitry 100 is configured to stop providing DC power from the variable voltage DC power supply 110 to the variable impedance ZV (e.g., to the input of the at least one DC-DC voltage converter) when the impedance of the variable impedance falls below the second impedance threshold level.

The detector circuitry 114 is configured to detect if the differential AC voltage level, e.g., peak or root mean square (RMS) differential voltage or current level, of the AC signal across the second bridge node N2 and the fourth bridge node N4 instantaneously or on average over a finite period of time, e.g., optionally a period of 1-1000 microseconds, exceeds a respective voltage or current threshold level. If the differential voltage or current level across the second and fourth bridge nodes N2, N4 exceeds (instantaneously or on average over a finite period) a corresponding threshold level, then the detector circuitry 114 is configured to generate an output signal used reduce the DC voltage generated by the variable voltage DC power supply 110. To achieve this functionality, the detector circuitry 114 may optionally comprise a peak or RMS voltage or current detector and a comparator. The optional voltage control circuitry 116 may be used to transform the signal output by the detector circuitry 114 so that optionally the DC voltage (output by the variable voltage DC power supply 110) is reduced for a finite period of time. This would allow, for example, a human being time to withdraw from electrically contacting the DC voltage. Optionally, the voltage control circuitry 116 may be implemented with a one shot circuit. A one shot circuit when triggered generates a voltage or current pulse for a predetermined finite time period. Such a pulse can be used to reduce the DC voltage of the variable voltage DC power supply 110 during the predetermined finite time period when the pulse is triggered.

In embodiments of the invention, the detector circuitry 114 (and the optional voltage control circuitry 116) are configured reduce the DC voltage of the DC power supplied to the input of the at least one voltage converters (and optionally do so for a predetermined finite period of time) when the optional additional impedance ZA is 8 Kohms or less and is electrically connected or coupled to the input impedance of the voltage converter(s) ZVC (or to the input of the voltage converter(s)).

Figure 2:
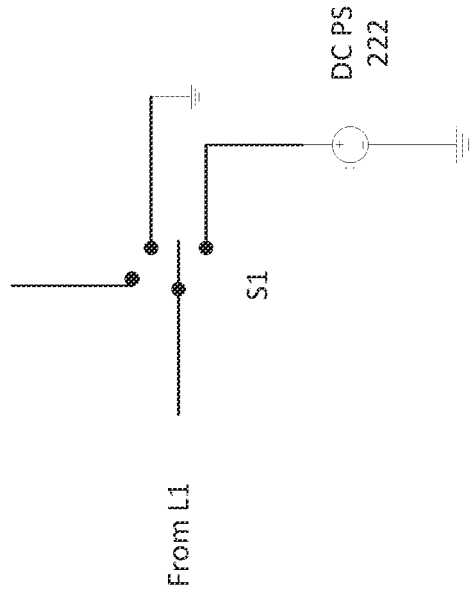
FIG. 2 illustrates a schematic diagram of one embodiment of a variable voltage direct current power supply.

FIG. 2 illustrates a schematic diagram of one embodiment of a variable DC voltage DC power supply 210. The illustrated variable voltage DC power supply 210 comprises switch S1, e.g., a single pole double throw (SPDT). However, other types of switches may be used, e.g., having more than one throw. For pedagogical reasons, switch S1 will be illustrated herein as a SPDT switch. A common node of the SPDT switch S1 is electrically coupled or connected to the first inductor L1. A first node of the switch S1 is electrically coupled or connected to an electrical ground. A second node of the switch S1 is electrically coupled or connected to a first node (a positive or negative voltage output port) of a DC voltage power supply (DC PS) 222. A second node (respectively a negative or positive voltage output port) of the DC voltage power supply 222 is electrically coupled to an electrical ground (or alternatively to the third bridge node N3. A switch with at least two poles, rather than a single pole single pole (SPST) switch, is used to maintain an AC ground in the absence of the DC voltage power supply 222. This allows the detector circuitry 114 to detect when the optional additional impedance ZA is no longer connected or coupled to the input impedance of the voltage converter(s) ZV (or to the input of the voltage converter(s)). Thus, when the detector circuitry 114 detects this condition, the detector circuitry 114 will no longer generate a signal used to reduce the output voltage of the variable voltage DC power supply 110. Optionally, the SPDT switch S1 may be implemented with a semiconductor switch utilizing transistors and/or a thyristor, and/or with an electromagnetic relay. Optionally, the detector circuitry 114 and/or the optional voltage control circuitry 116 may be configured to generate an optical signal, and thus the SPDT switch S1 may be implemented with an electro optical switch circuit. Further, optionally, as will be further discussed elsewhere herein, the variable DC voltage power supply 210 may be implemented with the DC voltage power supply 222, and the switch S1 may comprise part of the isolation circuitry 100 still being coupled to the second node of the first inductor L1.

Figure 3:
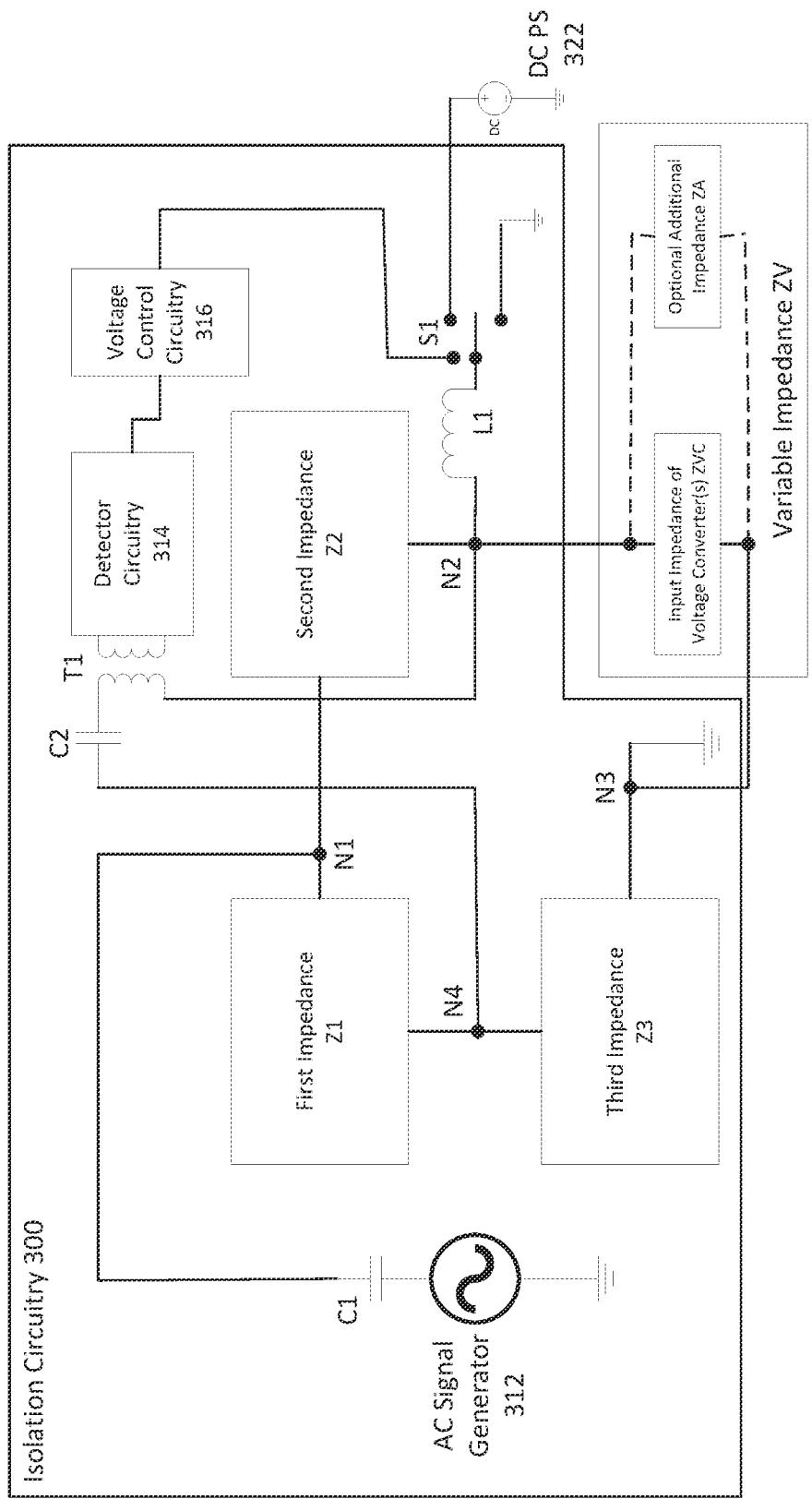
FIG. 3 illustrates a block diagram of another embodiment of isolation circuitry.

FIG. 3 illustrates block diagram of another embodiment of isolation circuitry 300. The isolation circuitry 300 includes the switch S1. A node of switch S1 is coupled to a DC power supply 322 which is external to the isolation circuitry 300. The other components of the isolation circuitry 300 are the same as those illustrated in FIG. 1, including the AC signal generator 312, the detector circuitry 314, and the voltage control circuitry 316. Optionally, the DC power supply 322 has a fixed output voltage (i.e., a positive or a negative fixed output voltage).

Returning to FIG. 1, the isolation circuitry 100 and the AC Wheatstone bridge comprise four bridge nodes N1, N2, N3, N4. A first bridge node N1 and a third bridge node N3 are separated by pairs of impedances: the first impedance Z1 and the third impedance Z3, and the second impedance Z2 and the variable impedance ZV. The second bridge node N2 and the fourth bridge node N4 are separated by different pairs of impedances: the first impedance Z1 and the second impedance Z2, and the third impedance Z3 and the variable impedance ZV.

A first node of the first impedance Z1 and a first node of the second impedance Z2 are electrically connected at the first bridge node N1. A second node of the second impedance Z1 and a first node of the variable impedance ZV are electrically connected at the second bridge node N2. A second node of the variable impedance ZV and a first node of the third impedance Z3 are electrically connected at the third bridge node N3. A second node of the third impedance Z3 and a second node of the first impedance Z1 are electrically connected at the fourth bridge node N4.

The isolation circuitry 100 and the AC Wheatstone bridge also comprise the AC signal generator 112 and the detector circuitry 114. The variable voltage DC power supply 110 is electrically coupled or connected to the second bridge node N2. The AC signal generator 112 is electrically coupled to the first bridge node N1 and the third bridge node N3. The AC signal generator 112 is configured to generate an AC signal. The detector circuitry 114 is electrically coupled to the second bridge node N2 and the fourth bridge node N4. The first inductor L1 blocks an AC signal generated by the AC signal generator from being coupled into the variable voltage DC power supply 110.

Optionally, the isolation circuitry 100 and the AC Wheatstone bridge comprise a first inductor L1, one or more optional capacitors, and a transformer. Optionally, the first inductor L1 may be part of the variable voltage DC power supply 110, and is serially coupled or connected to an output node of the variable voltage DC power supply 110 that is electrically coupled to the second bridge node N2. However, if the first inductor L1 is not part of the variable voltage DC power supply 110, the first inductor L1 is part of the isolation circuitry 100 and is electrically coupled between a node of the variable voltage DC power supply 110 and the second bridge node N2. Optionally, the AC signal generator 112 is electrically coupled to the first bridge node N1 and/or the third bridge node N3 by capacitor(s). The capacitor(s) block DC voltage from the variable voltage DC power supply 110 from being coupled into the AC signal generator 112. FIG. 1 illustrates one optional embodiment, for pedagogical purposes, where a first capacitor C1 (between a first node of the AC signal generator 112 and the first bridge node N1) is used to decouple the AC signal generator 112 from the DC voltage of the variable voltage DC power supply 110.

Two input nodes of an input of the detector circuitry 114 are electrically coupled to the second bridge node N2 and the fourth bridge node N4. Optionally, one or both nodes of the input of the detector circuitry 114 may be coupled by capacitors to respective bridge nodes. The capacitor(s) block DC voltage from the variable voltage DC power supply 110 from being coupled into the detector circuitry 114. FIG. 1 illustrates one optional embodiment, for pedagogical purposes, where a second capacitor C2 (between a first node of the input of the detector circuitry 114 and the fourth bridge node N4) is used to decouple the AC signal generator 112 from the DC voltage of the variable voltage DC power supply 110. Optionally, a transformer T1 can be electrically coupled between the input (or input nodes) of the detector circuitry 114 and the second bridge node N2 and the fourth bridge node N4. FIG. 1 illustrates this optional embodiment for pedagogical purposes. The transformer T1 also decouples the DC voltage of the variable voltage DC power supply 110 from the input of the detector circuitry 114.

Optionally, the isolation circuitry 100 comprises the voltage control circuitry 116. To the extent any capacitances and/or transformer, e.g., the first capacitance C1, the second capacitance C2, and the transformer T1, are utilized in the isolation circuitry 100, such components would also comprise part of the AC Wheatstone bridge.

Figure 4:
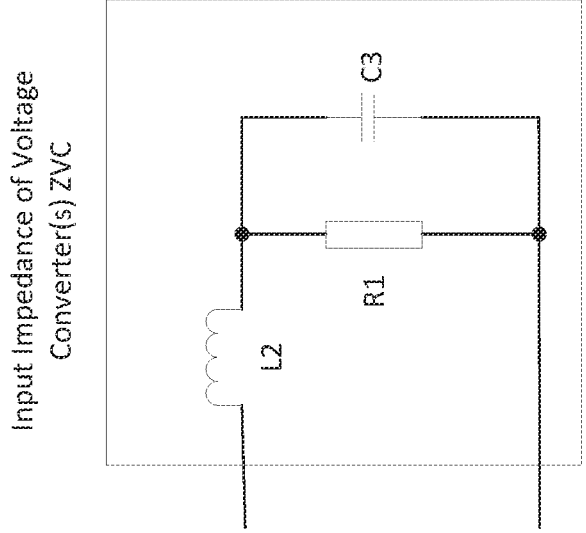
FIG. 4 illustrates a schematic diagram of one embodiment of an input impedance of at least one voltage converter.

FIG. 4 illustrates a schematic diagram of one embodiment of an input impedance of at least one voltage converter ZVC. The variable impedance at an input of at least one voltage converter ZV comprises an input including two input nodes. A second inductor L2 is electrically coupled or connected between the first input node and a first node of a first resistor R1 and a third capacitor C3 that are electrically coupled or connected in parallel. The second node of the input is a second node of the first resistor R1 and the third capacitor C3. The second inductor L2 represents an actual inductor used to isolate the DC-DC voltage converter(s) from the AC signal generated by AC signal generator 112. The first resistor R1 and the third capacitor C3, however, are a model representing the input impedance of the at least one voltage converter ZVC; the first resistor R1 and the third capacitor C3 do not necessarily represent physical electrical components used to implement the input impedance of the at least one voltage converter ZVC. The resistance and capacitance values of respectively the first resistor R1 and the third capacitor C3 depend upon the design of each of the at least one parallelly electrically coupled DC-DC power converters and a number of DC-DC power converters electrically coupled in parallel. However, the impedance of the first resistor R1 and the third capacitor C3 is relatively low at higher AC frequencies. Optionally, the first resistor R1 and the third capacitor C3 have values of respectively 400 Ohms and 1 microFarad. The fundamental frequency of the AC signal is selected so that the third capacitor C3 has a low impedance so that the second inductor L2 is effectively connected between both nodes of the input impedance ZVC at the fundamental frequency.

Returning to FIG. 1, the optional additional impedance ZA may represent an impedance, e.g., a resistance of a living entity (or inanimate object) that may electrically contact two conductors before the input nodes of the input impedance of the at least one voltage converter ZVC (which includes the second inductor L2). When modelling a living entity that is a human body, optionally the resistance of the optional additional impedance ZA is less than or equal to 8 Kohms. A human body resistance typically ranges from 500 ohms to 300 Kohms. However, unsafe conditions for a human being occur when the human body resistance is 8 Kohms or less. A lower human body resistance is more dangerous for a human being because it gives rise to a higher current flow through the human body. Embodiments of the invention detect when the optional additional resistance ZA is 8 Kohms or less is electrically connected or coupled to the input impedance of the voltage converter(s) ZVC (or to the input of the voltage converter(s)).

The output impedance of the variable voltage DC power supply 110 is relatively low at higher AC frequencies. The AC signal generator 112 is configured to generate an AC signal. The AC signal may be a sinusoidal, triangular wave, square wave, or another AC signal waveform. The fundamental frequency of the AC signal generated by the AC signal generated must be within a range so that a first inductor L1, a second inductor L2, and an inductor comprising the third impedance Z3 (described elsewhere herein) have inductances that substantially block (or isolate) the AC signal (so that the AC signal can be detected across the second and fourth bridge nodes N2, N4) and so that the AC signal can be detected by the detector circuitry 114. Optionally, to ensure that the aforementioned inductors substantially block the AC signal, the fundamental frequency of the AC signal is 1 MHz or greater, e.g., 2 MHz.

The AC signal generator 112 is electrically coupled between the first bridge node N1 and the third bridge node N3. Optionally, as illustrated in FIG. 1, the AC signal generator 112 may be electrically coupled through an electrical ground to the third bridge node N3. The variable voltage DC power supply 110 is coupled across the variable impedance ZV (e.g., across the input impedance of the voltage converter(s) ZVC) by the second bridge node N2 and the third bridge node N3. Optionally, as illustrated in FIG. 1, the variable voltage DC power supply 110 may be electrically coupled through the electrical ground to the third bridge node N3.

The impedance, e.g., resistance, values of Z1 and Z2 are chosen to be identical. The impedance values, e.g., inductance values, of the third impedance Z3, and the impedance value of the nominal impedance in parallel with an impedance of the first inductor L1 should be chosen to be equal too. This is because, for an AC signal of sufficiently high frequency, the variable voltage DC power supply 110 is a low impedance for one node of the first inductor L1, and the first resistor R1 and the third capacitor C2 electrically connected in parallel are a low impedance path for L2. Thus, for the AC signal of sufficiently high frequency, the first inductor L1 and the second inductor L2 are electrically coupled or connected in parallel.

Because the impedance in each leg of the bridge is initially equal, no AC signal is detectable across the second and the fourth bridge nodes N2, N4 of the AC Wheatstone bridge. Only when either the first impedance Z1 and the second impedance Z2 have different impedance values, or the third impedance Z3 and the variable impedance ZV have different impedance values is an AC signal discernible across the second and the fourth bridge nodes N2, N4. The greater the difference in impedance between one or both of the pairs of impedances, the higher the amplitude of the AC signal that can be detected across the second and the fourth bridge nodes N2, N4.

Thus, the electrical circuits forming the first impedance Z1 and the second impedance Z2 are identical having the same topology and parameter values. Optionally, the first impedance Z1 and the second impedance Z2 are resistors having the same resistance, e.g., optionally 1 kOhm. The impedance of Z3 is selected to have the same impedance as the circuit formed by L1 electrically coupled in parallel a circuit formed by the second inductor L2 electrically coupled in series with the input impedance of the voltage converter(s) ZVC. At a sufficiently high carrier frequency of the AC signal generator 112, the input impedance of the voltage converter(s) ZVC is a low impedance or short circuit. As a result, the first inductor L1 and the second inductor L2 are electrically coupled in parallel. Thus, if the value of the first inductor L1 has an inductance value of Lval1 and the second inductor L2 has an inductance value Lval2, then Z3 should be an inductor having an inductance value of $1/(1/Lval1+1/Lval2)$. If the first inductor L1 and the second inductor L2 have the same inductance value, e.g., 50 microHenries, then has Z3 should be an inductor having an inductance value of 25 microHenries.

Figure 5A:
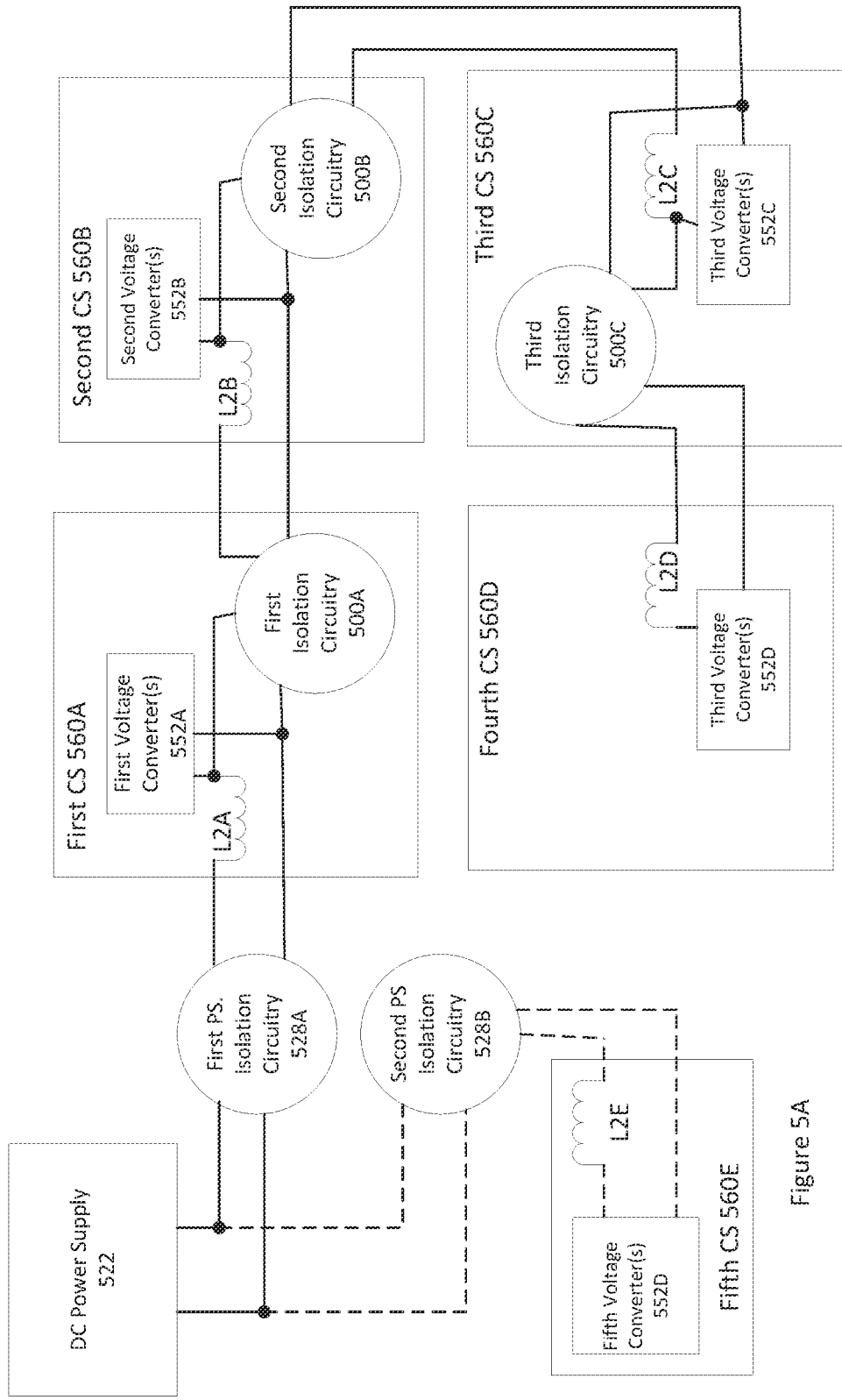
FIG. 5A illustrates a block diagram of one embodiment of a DC power distribution system daisy chaining isolation circuitry.
Figure 5B:
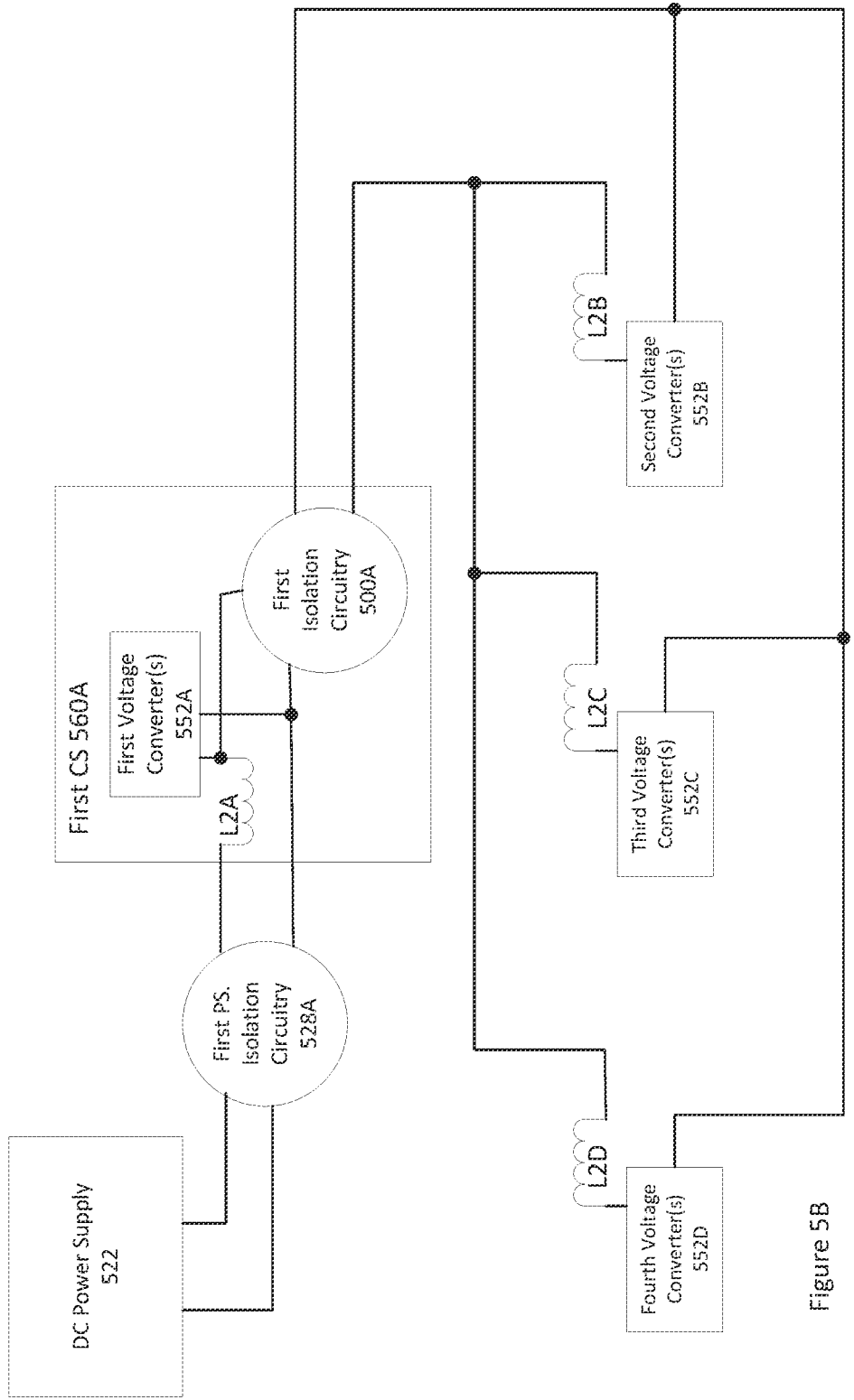
FIG. 5B illustrates a block diagram of one embodiment of a DC power distribution system with an isolation circuitry electrically coupled or connected with parallel voltage converters.

FIG. 5A illustrates a block diagram of one embodiment of a DC power distribution system 550A daisy chaining isolation circuitry. The DC power distribution system 550A may be also referred to as a daisy chained DC power distribution circuit. Daisy chaining means electrically connecting or coupling in series. A daisy chained DC power distribution circuit 550A may comprise one or more branches, where each branch comprises daisy chained components. Each component in the illustrated DC power distribution circuits of FIGS. 5A and 5B are coupled by a pair of conductors, e.g., wires, used to convey DC power from a DC power supply.

The daisy chained DC power distribution system 550A comprises a DC power supply 522, at least one power supply (PS) isolation circuitry 528X, and at least one converter system (or converter circuitry or CS) 560X. Input nodes of each of the at least one PS isolation circuitry 528X are electrically coupled or connected to output nodes of the DC power supply 522. At least one converter system 560X is daisy chained to each PS isolation circuitry 528X. If more than one converter system 560X is daisy chained to each PS isolation circuitry 528X, then an input of each additional converter system is daisy chained to the output of the preceding converter system.

For pedagogical purposes, FIG. 5A illustrates one daisy chained branch with four converter systems 560A, 560B, 560C, 560D daisy chained with a first PS isolation circuitry 528A. Thus, the first PS isolation circuitry 528A has input nodes and output nodes respectively electrically coupled or connected to output nodes of the DC power supply 522 and input nodes of the first CS 560A. The second CS 560B has input nodes and output nodes respectively electrically coupled or connected to output nodes of the first CS 560A and input nodes of the third CS 560C. The fourth CS 560D has input nodes electrically coupled or connected to output nodes of the third CS 560C. The nodes of daisy chained DC power supply 522, first PS isolation circuitry 528A, and the first, second, third, and fourth converter systems 560A, 560B, 560C, 560D are coupled or connected to nodes of respective components by two conductors, e.g., wires.

Optionally, two or more daisy chained branches may be coupled in parallel with the DC power supply 522. FIG. 5A illustrates for pedagogical purposes an optional second daisy chained branch comprising a second PS isolation circuitry 528B electrically coupled or connected to a fifth converter system 560E.

Each converter system 560X comprises an inductor L2X serially coupled or connected between one input node of the converter system 560X and an input node of the corresponding voltage converter(s) 552X. Optionally, a converter system 560X further comprises isolation circuitry 500X coupled to the input nodes of the corresponding voltage converter(s). For example, the illustrated fourth CS 560D and the fifth CS 560E each comprise only an inductor L2X and a voltage converter(s) 552X. Each inductor L2X is configured to block the AC signal generated in the isolation circuitry from propagating from a CS (in which the isolation circuitry is located) to the next CS. The inductance of each inductor L2X is accounted for in determining the value of AC Wheatstone bridge component(s), e.g., the third impedance Z3, in the isolation circuitry 500X of the preceding CS 560A.

The daisy chained DC power distribution system 550A has the benefit that when an optional additional impedance ZA of below an impedance threshold value is detected by the one of the isolation circuitry 528X, 500X in a branch of the daisy chained DC power distribution system 550A, the affected isolation circuitry will only disable supply of DC power to voltage converter(s) serially coupled downstream from the affected isolation circuitry. Further, other parallel branch(es) are unaffected by such detection.

FIG. 5B illustrates a block diagram of one embodiment of a DC power distribution system 550B with an isolation circuitry electrically coupled or connected with parallel voltage converters. The DC power supply 522, first PS isolation circuitry 528A, and first CS 560A are implemented as described with respect to FIG. 5A. The first CS 560A is daisy chained to the first PS isolation circuitry 528A.

However, two or more voltage converters 552X are electrically coupled to the output nodes of the first CS 560A, and thus the first isolation circuitry 500A. For pedagogical purposes, FIG. 5B illustrates three voltage converters (a second voltage converter 552B, a third voltage converter 552C, and a fourth voltage converter 552D). One output node of the first CS 560A, and thus of the first isolation circuitry 500A, is electrically coupled through a pair of conductors to one or more inductors L2X uniquely associated with an input node of corresponding voltage converter(s) 552X. Each inductor L2X is electrically coupled or connected to an input node of the corresponding voltage converter(s) 552X. For pedagogical purposes, FIG. 5B illustrates a unique inductor (inductor L2B, inductor L2C, inductor L2D) coupled between an input node of a corresponding voltage converter(s) 552X and an output node of the first CS 560A (and thus of the first isolation circuitry 500A). Each inductor L2X is configured to block the AC signal (generated in the first isolation circuitry 500A and propagating along pairs of conductors) from being electrically coupled into input of the two or more voltage converter(s) 552X. The inductance of each inductor L2X is accounted for in determining the value of AC Wheatstone bridge component(s), e.g., the third impedance Z3, in the first isolation circuitry 500A.

The parallel voltage converter(s) architecture has the benefit of reducing the number of isolation circuitry. However, when an optional additional impedance ZA of below an impedance threshold value is detected by the first isolation circuitry 500A, then all of the voltage converter(s) 552B, 552C, 552D coupled or connected to output nodes of the first isolation circuitry 500A will not receive DC power.

Figure 6:
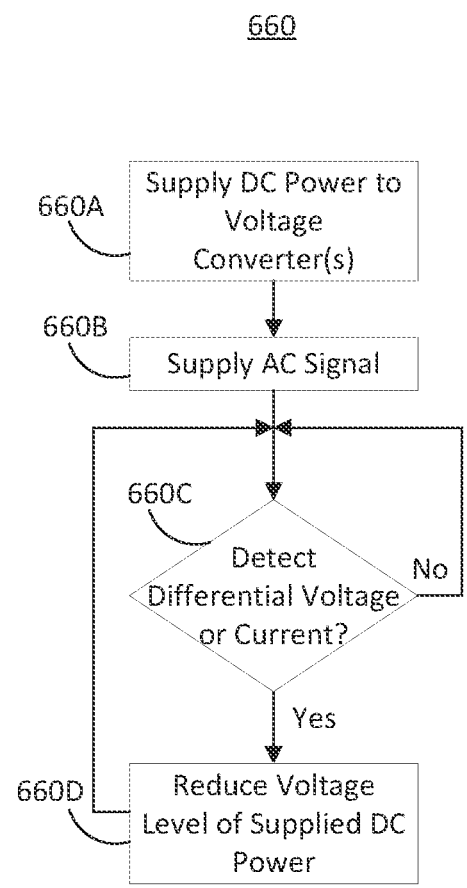
FIG. 6 illustrates a flow diagram of one embodiment of a method of detecting a low impedance across conductors in a power distribution system.

FIG. 6 illustrates a flow diagram of one embodiment of a method 660 of detecting a low impedance across conductors in a power distribution system. To the extent that the embodiment of method 660 shown in FIG. 6 is described herein as being implemented in the apparatus shown in FIGS. 1 through 5, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 660A, supply DC power at a first voltage level, e.g., 380V or more, through a second bridge node and a third bridge node of an electrical bridge circuit. The electrical bridge circuit comprises a first impedance comprising a first node and a second node, a second impedance comprising a first node and a second node, a third impedance comprising a first node and a second node, an input impedance of at least one DC-DC voltage converter comprising a first node and a second node, a first bridge node, a second bridge node, a third bridge node, and a fourth bridge node, wherein the first bridge node connects the first node of the first impedance to the first node of the second impedance, the second bridge node connects the second node of the second impedance to the first node of the input impedance of the at least one DC-DC voltage converter, the third bridge node connects the first node of third impedance to the second node of the input impedance, and the fourth bridge node connects the second node of the first impedance to the second node of the third impedance, and wherein the input impedance comprises a second inductor electrically coupled between the second bridge node and the third bridge node.

In block 660B, supplying an AC signal, comprising a fundamental frequency, to the first bridge node and the third bridge node, wherein at a fundamental frequency greater than a threshold frequency, and wherein at a fundamental frequency greater than a threshold frequency, an impedance of the first inductor in parallel with the second inductor substantially equals the first impedance divided by the second impedance multiplied by the third impedance. The first, second, third impedance values and the first and second inductor values are selected so that no differential voltage or current can be detected between the second bridge node and a fourth bridge node—unless an optional impedance (or resistance) is electrically coupled or connected in parallel with the input impedance of at least one DC-DC voltage converter (e.g., the second inductor).

In block 660C, determine if a peak or RMS differential voltage or current across the first bridge node and a third bridge node exceeds a corresponding threshold level is detected. If no peak or RMS differential voltage or current across the first bridge node and the second bridge node in excess of the corresponding threshold level is detected, then return to block 660C. If a peak or RMS differential voltage or current across the first bridge node and the second bridge node in excess of the corresponding threshold level is detected, then in block 660D, reduce voltage level, e.g., to zero volts, of the supplied DC power. Optionally, reduce the voltage level for at least a fixed time period. Then, return to block 660C.

EXEMPLARY EMBODIMENTS

Example 1 includes an apparatus, comprising: a first electrical impedance comprising a first node and a second node; a second electrical impedance comprising a first node and a second node; a third electrical impedance comprising a first node and a second node; a first inductor comprising a first node and a second node; a first bridge node electrically connecting the first node of the first electrical impedance to a first node of the second electrical impedance; a second bridge node configured to electrically connect the second node of the second electrical impedance through the first inductor to a first input node of at least one direct current (DC)-DC voltage converter configured to convert a higher input DC voltage to a lower output DC voltage and comprising an input impedance including a second inductor is electrically coupled between the second bridge node and a third bridge node; the third bridge node electrically connected to the first node of the third electrical impedance and a second input node of the at least one DC-DC voltage converter; a fourth bridge node electrically connecting the second node of the third electrical impedance and the second node of the first electrical impedance; an alternating current (AC) signal generator configured to generate an AC signal comprising a fundamental frequency and comprising a first node and a second node, wherein the first node of the AC signal generator is electrically coupled to the first bridge node and the second node of the AC signal generator is electrically coupled to the third bridge node, wherein at the fundamental frequency greater than a threshold frequency, an impedance value of the first inductor in parallel with the second inductor substantially equals a value of the first electrical impedance divided by a value of the second electrical impedance multiplied by a value of the third electrical impedance; and detector circuitry comprising a first input node, a second input node, and an output, wherein the first input node of the detector circuitry is electrically coupled to the second bridge node and the second input node of the detector circuitry is electrically coupled to the fourth bridge node, wherein the detector circuitry is configured to (a) detect when a differential peak or root mean square (RMS) voltage or current level across the second bridge node and the fourth bridge node exceeds a corresponding threshold level and (b) upon such detection, then generate an electrical signal to cause a DC voltage across the second bridge node and the third bridge node to be reduced.

Example 2 includes the apparatus of Example 1, wherein the reduced DC voltage supplied to the first input node and the second input node of the at least one DC-DC voltage converter results in a net direct current that is less than twenty five milliamps, and wherein the net direct current is a direct current output from the second bridge node less a direct current drawn by an input of the DC-DC voltage converter.

Example 3 includes the apparatus of Example 2, wherein the reduced DC voltage equals zero volts.

Example 4 includes the apparatus of any of Examples 1-3, further comprising a switch comprising a common node, a first node, and a second node, wherein the common node is electrically coupled to the second node of the first inductor, the first node of the switch is configured to be electrically coupled to a first node of a DC power supply, the second node of the switch is electrically coupled to the third bridge node; wherein the switch is configured to couple the common node to either the first node of the switch or the second node of the switch based upon the electrical signal generated by the detector circuitry.

Example 5 includes the apparatus of any of Examples 1-4, wherein the first electrical impedance and the second electrical impedance each consist of a resistor with a same resistance value, the first inductor and the second inductor each have a same inductance value, and the third electrical impedance consists of an inductance with a inductance value that is one half of the inductance value of each of the first inductor and the second inductor.

Example 6 includes the apparatus of any of Examples 1-5, further comprising voltage control circuitry comprising an input and an output, wherein the input of the voltage control circuitry is coupled to the output of the detector circuitry, and wherein the voltage control circuitry is configured to reduce, for a predetermined finite period of time, the DC voltage across the second bridge node and the third bridge node.

Example 7 includes the apparatus of any of Examples 1-6, further comprising a transformer comprising a first set of windings electrically coupled to the second and the fourth bridge nodes, and a second set of windings electrically coupled to the first and the second input nodes of the detector circuitry.

Example 8 includes the apparatus of any of Examples 1-7, further comprising a capacitor electrically coupled between either the first node of the AC signal generator and the first bridge node, or the second node of the AC signal generator and the third bridge node.

Example 9 includes the apparatus of any of Examples 1-8, further comprising a capacitor electrically coupled between either the first input node of the detector circuitry and the second bridge node, or the second input node of the detector circuitry and the fourth bridge node.

Example 10 includes the apparatus of any of Examples 1-9, wherein each DC-DC voltage converter is a buck converter.

Example 11 includes a direct current (DC) power distribution system, comprising: a DC power supply comprising an output configured to supply DC electrical power; first isolation circuitry comprising an input and an output, wherein the input is electrically coupled to the output of the DC power supply; a first inductor; a first at least one DC-DC voltage converter comprising an input and an output, wherein the input of the first at least one DC-DC voltage converter electrically coupled through the first inductor to the output of the first isolation circuitry, and wherein each DC-DC voltage converter converts a higher input DC voltage to a lower output DC voltage; wherein the first isolation circuitry is configured to detect when a first additional resistance with a first resistance value less than or equal to a resistance threshold level is connected across the input of the first at least one DC-DC voltage converter, and to reduce a DC voltage supplied to the input of the first at least one DC-DC voltage converter; second isolation circuitry comprising an input and an output, wherein the input is electrically coupled to and configured to receive DC electrical power from either the output of the DC power supply or the output of the first isolation circuitry; a second inductor; and a second at least one DC-DC voltage converter comprising an input and an output, wherein the input of the second at least one DC-DC voltage converter is electrically coupled through the second inductor to the output of the second isolation circuitry; wherein the second isolation circuitry is configured to detect when a second additional resistance with a second resistance value less than or equal to the resistance threshold level is connected across the input of the second at least one DC-DC voltage converter, and to reduce a DC voltage supplied to the input of the second at least one DC-DC voltage converter; wherein the reduction of the DC voltage supplied to the input of the second at least one DC-DC voltage converter does not affect the DC voltage supplied to the input of the first at least one DC-DC voltage converter.

Example 12 includes the DC power distribution system of Example 11, wherein the reduced DC voltage supplied to the input of either the first or the second at least one DC-DC voltage converter results in a net direct current that is less than twenty five milliamps, and wherein the net direct current is a direct current at the output of the corresponding isolation circuitry less a direct current drawn by a corresponding at least one DC-DC voltage converter.

Example 13 includes the DC power distribution system of any of Examples 11-12, wherein the resistance threshold level is less than or equal to eight kiloohms.

Example 14 includes the DC power distribution system of any of Examples 11-13, wherein the first and the second isolation circuitry are each further configured to reduce the DC voltage for a predetermined finite period of time.

Example 15 includes the DC power distribution system of any of Examples 11-14, further comprising: a first radio electrically coupled to the output of the first at least one DC-DC voltage converter; and a second radio electrically coupled to the output of the second at least one DC-DC voltage converter.

Example 16 includes the direct current (DC) power distribution system of any of Examples 11-15, where each of the first isolation circuitry and the second isolation circuitry comprises: a first electrical impedance comprising a first node and a second node; a second electrical impedance comprising a first node and a second node; a third electrical impedance comprising a first node and a second node; a third inductor comprising a first node and a second node; a first bridge node electrically connecting the first node of the first electrical impedance to a first node of the second electrical impedance; a second bridge node configured to electrically connect the second node of the second electrical impedance through the third inductor to a first input node of at least one DC-DC voltage converter configured to convert a higher input DC voltage to a lower output DC voltage; a third bridge node electrically connected to the first node of the third electrical impedance and a second input node of the at least one DC-DC voltage converter, wherein an input node of corresponding isolation circuitry comprises the second node of the third inductor and the third bridge node, and wherein an output of the corresponding isolation circuitry comprises the second bridge node and the third bridge node; a fourth bridge node electrically connecting a second node of the third electrical impedance and a second node of the first electrical impedance; an alternating current (AC) signal generator configured to generate an AC signal comprising a fundamental frequency and comprising a first node and a second node, wherein the first node of the AC signal generator is electrically coupled to the first bridge node and the second node of the AC signal generator is electrically coupled to the third bridge node, wherein at the fundamental frequency greater than a threshold frequency, an impedance value of the third inductor in parallel with the first inductor or the second inductor substantially equals a value of the first electrical impedance divided by a value of the second electrical impedance multiplied by a value of the third electrical impedance; and detector circuitry comprising a first input node, a second input node, and an output, wherein the first input node of the detector circuitry is electrically coupled to the second bridge node and the second input node of the detector circuitry is electrically coupled to the fourth bridge node, wherein the detector circuitry is configured to (a) detect when a differential peak or root mean square (RMS) voltage or current level across the second bridge node and the fourth bridge node exceeds a corresponding threshold level and (b) upon detecting, then generate an electrical signal to cause a DC voltage across the second bridge node and the third bridge node to be reduced.

Example 17 includes the DC power distribution system of any of Examples 11-16, wherein each DC-DC voltage converter is a buck converter.

Example 18 includes a method, comprising: supplying DC power at a first voltage level through a first inductor to at least a second bridge node and a third bridge node of an electrical bridge circuit, wherein the electrical bridge circuit comprises a first impedance comprising a first node and a second node, a second impedance comprising a first node and a second node, a third impedance comprising a first node and a second node, an input impedance of at least one DC-DC voltage converter comprising a first node and a second node, a first bridge node, the second bridge node, the third bridge node, and a fourth bridge node, wherein the first bridge node connects the first node of the first impedance to the first node of the second impedance, the second bridge node connects the second node of the second impedance to the first node of the input impedance of the at least one DC-DC voltage converter, the third bridge node connects the first node of third impedance to the second node of the input impedance, and the fourth bridge node connects the second node of the first impedance to the second node of the third impedance, and wherein the input impedance comprises a second inductor electrically coupled between the second bridge node and the third bridge node; supplying an alternating current (AC) signal, comprising a fundamental frequency, to the first bridge node and the third bridge node, wherein at the fundamental frequency greater than a threshold frequency, and wherein at the fundamental frequency greater than a threshold frequency, an impedance of the first inductor in parallel with the second inductor substantially equals the first impedance divided by the second impedance multiplied by the third impedance; determining if a differential peak or root mean square (RMS) voltage or current across the second bridge node and the fourth bridge node exceeds a corresponding threshold level is detected; and upon determining that the differential peak or the RMS voltage or the current across the first bridge node and the second bridge node exceeds the corresponding threshold level, then reducing a DC voltage level provided to an input of the at least one DC-DC voltage converter.

Example 19 includes the method of Example 18, wherein reducing the DC voltage level comprises reducing a DC voltage level for a finite period of time.

Example 20 includes the method of any of Examples 18-19, wherein reducing the DC voltage level comprises halting a supply of DC power from a DC power supply to the second bridge node.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. An electrical power distribution system, comprising:
   first isolation circuitry comprising an input and an output, wherein the input of the first isolation circuitry is configured to be electrically coupled to an output of a direct current (DC) power supply, and wherein the output of the first isolation circuitry is configured to be coupled to an input of a first voltage converter;
   second isolation circuitry comprising an input and an output, wherein the input of the second isolation circuitry is configured to be electrically coupled to the output of the first isolation circuitry and to an input of the first voltage converter, and wherein the output of the second isolation circuitry is configured to be coupled to an input of a second voltage converter; and
   third isolation circuitry comprising an input and an output, wherein the input of the third isolation circuitry is configured to be electrically coupled to the output of the second isolation circuitry and to an input of the second voltage converter;
   wherein the first isolation circuitry is configured to detect when a first additional resistance with a first resistance value less than or equal to a resistance threshold level is electrically connected across the output of the first isolation circuitry, and, upon detecting that the first resistance value that is less than or equal to the resistance threshold level, then reduce a DC voltage level supplied at the output of the first isolation circuitry;
   wherein the second isolation circuitry is configured to detect when a second additional resistance with a second resistance value less than or equal to the resistance threshold level is electrically connected across the output of the second isolation circuitry, and, upon detecting that the second resistance value that is less than or equal to the resistance threshold level, then reduce a DC voltage level supplied at the output of the second isolation circuitry;
   wherein the third isolation circuitry is configured to detect when a third additional resistance with a third resistance value less than or equal to the resistance threshold level is electrically connected across the output of the third isolation circuitry, and, upon detecting that the third resistance value that is less than or equal to the resistance threshold level, then reduce a DC voltage level supplied at the output of the third isolation circuitry;
   wherein a reduction of a DC voltage level supplied at an output of isolation circuitry does not affect a DC voltage level supplied to an input of the isolation circuitry.

2. The electrical power distribution system of claim 1, wherein the resistance threshold level is less than or equal to eight kiloohms.

3. The electrical power distribution system of claim 1, wherein each of the first, the second, and the third isolation circuitry is further configured to reduce the DC voltage level, at their respective output, for a predetermined finite period of time.

4. The electrical power distribution system of claim 1, wherein the first voltage converter and the second voltage converter are each a DC-DC voltage converter.

5. The electrical power distribution system of claim 1, further comprising:
   the DC power supply;
   the first voltage converter;
   the second voltage converter;
   a first radio electrically coupled to an output of the first voltage converter; and
   a second radio electrically coupled to an output of the second voltage converter.

6. The electrical power distribution system of claim 1, wherein the first isolation circuitry,
   the second isolation circuitry, and the third isolation circuitry each further comprise:
   an alternating current (AC) Wheatstone bridge;
   an AC signal generator electrically coupled to first and third nodes of the AC Wheatstone bridge; and
   detector circuitry electrically coupled to second and fourth nodes of the AC Wheatstone bridge and configured to (a) detect when a differential peak or root mean square (RMS) voltage or current level across two nodes of the AC Wheatstone bridge exceeds a corresponding threshold level and (b) upon detecting that the corresponding threshold level has been exceed, then generate an electrical signal to cause the DC voltage level at an output of the isolation circuitry to be reduced.

7. The electrical power distribution system of claim 1, wherein the first and the second voltage converters are each a DC-DC buck voltage converter.

8. An electrical power distribution system, comprising:
   isolation circuitry comprising an input and an output, wherein the input of the isolation circuitry is configured to be electrically coupled to an output of a direct current (DC) power supply, and wherein the output of the isolation circuitry is configured to be coupled to an input of a first voltage converter and an input of a second voltage converter; and wherein the isolation circuitry is configured to detect when an additional resistance with a resistance value less than or equal to a resistance threshold level is electrically connected across the output of the isolation circuitry, and, upon detecting that the resistance value that is less than or equal to the resistance threshold level, then reduce a DC voltage level supplied at the output of the isolation circuitry;

wherein a reduction of the DC voltage level supplied at the output of the isolation circuitry does not affect a DC voltage supplied to the input of the isolation circuitry;

wherein the isolation circuitry further comprises:

an alternating current (AC) Wheatstone bridge;

an AC signal generator electrically coupled to first and third nodes of the AC Wheatstone bridge; and detector circuitry electrically coupled to second and fourth nodes of the AC Wheatstone bridge and configured to (a) detect when a differential peak or root mean square (RMS) voltage or current level across two nodes of the AC Wheatstone bridge exceeds a corresponding threshold level and (b) upon detecting that the corresponding threshold level has been exceed, then generate an electrical signal to cause the DC voltage level at the output of the isolation circuitry to be reduced.

9. The electrical power distribution system of claim 8, wherein the resistance threshold level is less than or equal to eight kiloohms.

10. The electrical power distribution system of claim 8, wherein the isolation circuitry is further configured to reduce the DC voltage level, at the output of the isolation circuitry, for a predetermined finite period of time.

11. The electrical power distribution system of claim 8, wherein the first voltage converter and the second voltage converter are each a DC-DC voltage converter.

12. The electrical power distribution system of claim 8, further comprising:
the DC power supply;
the first voltage converter;
the second voltage converter;
a first radio electrically coupled to an output of the first voltage converter; and
a second radio electrically coupled to an output of the second voltage converter.

13. The electrical power distribution system of claim 8, wherein the first and the second voltage converters are each a DC-DC buck voltage converter.

14. An electrical power distribution system, comprising:
first isolation circuitry comprising an input and an output, wherein the input of the first isolation circuitry is configured to be electrically coupled to an output of a direct current (DC) power supply, and wherein the output of the first isolation circuitry is configured to be coupled to an input of a first voltage converter;
second isolation circuitry comprising an input and an output, wherein the input of the second isolation circuitry is configured to be electrically coupled to the input of the first isolation circuitry, and wherein the output of the second isolation circuitry is configured to be coupled to an input of a second voltage converter;

wherein the first isolation circuitry is configured to detect when a first additional resistance with a first resistance value less than or equal to a resistance threshold level is electrically connected across the output of the first isolation circuitry, and, upon detecting that the first resistance value that is less than or equal to the resistance threshold level, then reduce a DC voltage level supplied at the output of the first isolation circuitry;

wherein the second isolation circuitry is configured to detect when a second additional resistance with a second resistance value less than or equal to the resistance threshold level is electrically connected across the output of the second isolation circuitry, and, upon detecting that the second resistance value that is less than or equal to the resistance threshold level, then reduce a DC voltage level supplied at the output of the second isolation circuitry; and wherein a reduction of a DC voltage level supplied at an output of isolation circuitry does not affect an DC voltage level supplied to an input of the isolation circuitry.

15. The electrical power distribution system of claim 14, wherein the resistance threshold level is less than or equal to eight kiloohms.

16. The electrical power distribution system of claim 14, wherein each of the first and the second isolation circuitry is further configured to reduce the DC voltage level, at their respective output, for a predetermined finite period of time.

17. The electrical power distribution system of claim 14, wherein the first voltage converter and the second voltage converter are each a DC-DC voltage converter.

18. The electrical power distribution system of claim 14, further comprising:
the DC power supply;
the first voltage converter;
the second voltage converter;
a first radio electrically coupled to an output of the first voltage converter; and
a second radio electrically coupled to an output of the second voltage converter.

19. The electrical power distribution system of claim 14, wherein the first isolation circuitry, and the second isolation circuitry each further comprise:
an alternating current (AC) Wheatstone bridge;
an AC signal generator electrically coupled to first and third nodes of the AC Wheatstone bridge; and
detector circuitry electrically coupled to second and fourth nodes of the AC Wheatstone bridge and configured to (a) detect when a differential peak or root mean square (RMS) voltage or current level across two nodes of the AC Wheatstone bridge exceeds a corresponding threshold level and (b) upon detecting that the corresponding threshold level has been exceed, then generate an electrical signal to cause the DC voltage level at the output of the isolation circuitry to be reduced.

20. The electrical power distribution system of claim 14, wherein the first and the second voltage converters are each a DC-DC buck voltage converter.

* * * * *

UNITED STATES PATENT AND TRADEMARK OFFICE
CERTIFICATE OF CORRECTION

PATENT NO.         : 11,962,236 B2
APPLICATION NO.    : 18/155497
DATED              : April 16, 2024
INVENTOR(S)        : Al-Mufti et al.

It is certified that error appears in the above-identified patent and that said Letters Patent is hereby corrected as shown below:

On the Title Page

• Page 2: Item (56) U.S. Patent Documents: 2021/0373058 A1* 12/2021, please replace --Yang-- with "Yang et al."

In the Claims

• Column 18, Line 54, please replace --exceed-- with "exceeded" between "has been" and ", then generate"

• Column 19, Line 22, please replace --exceed-- with "exceeded" between "has been" and ", then generate"

• Column 20, Line 19, please replace --an-- with "a" between "not affect" and "DC voltage"

Signed and Sealed this
Fourth Day of June, 2024

Katherine Kelly Vidal
*Director of the United States Patent and Trademark Office*